July 6, 1948.                H. P. HEATH                 2,444,737
                            ELECTRICAL COIL
                         Filed April 11, 1944
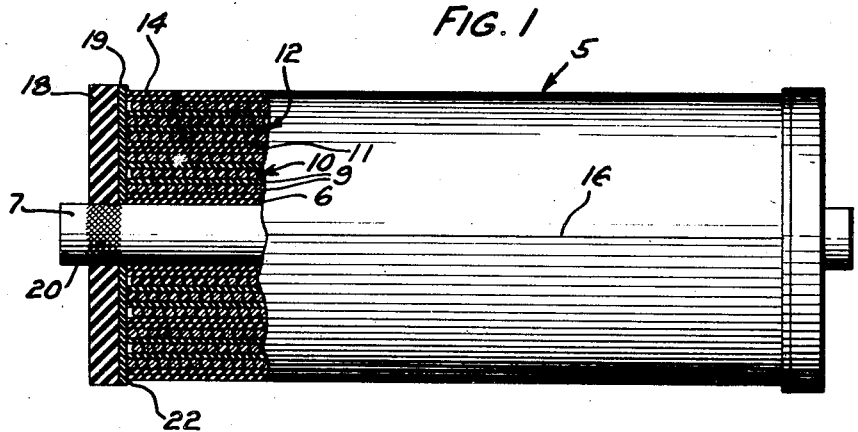
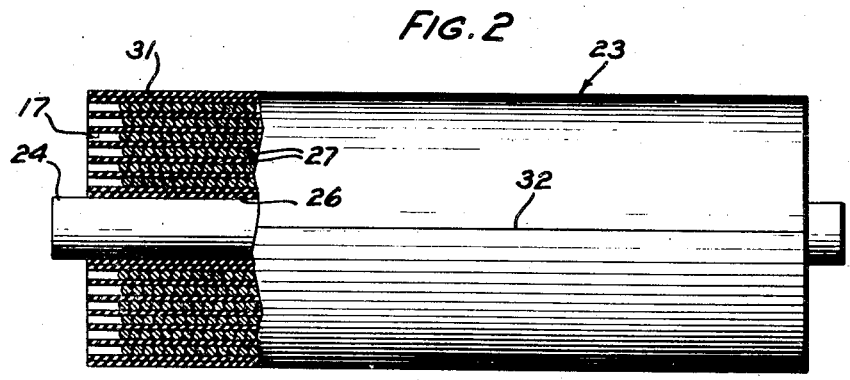
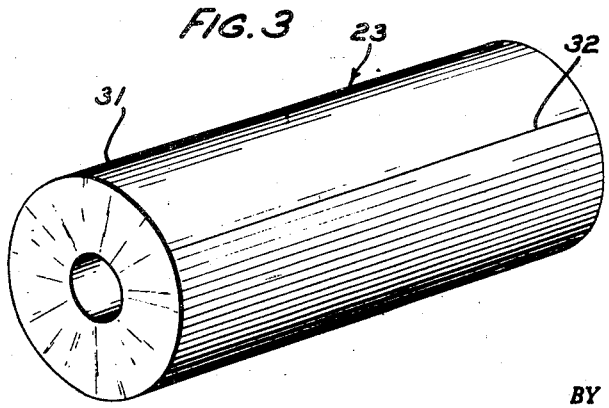
INVENTOR.
H. P. HEATH
BY
ATTORNEY Patented July 6, 1948

2,444,737

UNITED STATES PATENT OFFICE 2,444,737

ELECTRICAL COIL

Herbert P. Heath, Riverside, Ill., assignor to Western Electric Company, Incorporated, New York, N. Y., a corporation of New York Application April 11, 1944, Serial No. 530,447

13 Claims. (Cl. 175—21)

1

This invention relates to electrical coils and more particularly to electrical coils having protective interleaving, interwinding and inner and outer peripheral covering layers.

In the manufacture of electrical coils for use in connection with electrical apparatus, such as telephone equipment, it is sometimes the practice to form coils of single or multiple windings, with or without heads, each winding comprising alternate layers of conducting material interleaved by layers of insulating material and in the case of multiple winding coils, the windings have an interwinding of insulating material therebetween. Inner and outer peripheries of the coils are also covered with layers of insulating material.

An object of the present invention is to provide an electrical coil having efficient and effective protective interleaving, interwinding and inner and outer peripheral covering layers.

In accordance with the above object, the features of the present invention, in one embodiment thereof, are applied to a headed electrical coil of multiple windings which may be made by employing sheet insulating material composed of polyamides obtainable by condensation polymerization from a diamine and a dibasic carboxylic acid between the individual windings and also as the insulating material surrounding the inner and outer peripheries of the coil with sheet cellulose acetate interleaved between the layers of conducting material comprising each individual winding. In headed coils, cellulose acetate faced phenol fiber heads may be cemented to opposite ends of the coil by applying acetone to the cellulose acetate head facings and to the cellulose acetate interleavings which extend from the coil ends and are crushed against the ends of the windings. The described sheet insulating material derived from the referred-to polyamides may be employed as the interleaving insulation between the layers of conducting material instead of sheet cellulose acetate in the case of headless coils.

Other objects and advantages of this invention will more clearly appear from the following detailed description, taken in conjunction with the accompanying drawing, in which Fig. 1 is an elevation of an electrical coil produced in accordance with one embodiment of this invention, part of the coil being broken away and in section to illustrate the details of the structure;

Fig. 2 is an elevation, partly broken away and in section, of a modified form of coil; and Fig. 3 is a perspective view of the completed coil shown in Fig. 2.

2

Electrical coils as used in electrical communication or other fields are subject to a variety of climatic conditions and it is, therefore, desirable to prevent corrosion, either by using insulating materials of such superior characteristics that leakage paths will not be set up in the presence of moisture, or by sealing the coil structure to exclude moisture or other atmospheric foreign elements. Cellulose acetate and other similar cellulose derivatives have heretofore been used and are well suited for either sealed or unsealed coil construction.

Although such derivatives have excellent electrical characteristics, one objection to their use has been that acetone used to secure coil covers and spool heads affects the acetone soluble cellulose derivatives so as to cause shrinkage or other reaction detrimental to the insulating properties. This effect is not serious in the case of interleavings between conducting layers, but in the case of insulators between adjacent windings or between a metal core and a winding, it is very objectionable due to higher voltages involved and often causes breakdowns. Although the described sheet insulating material of the referred-to polyamides possesses excellent electrical insulating characteristics, it is not acetone soluble and, therefore, it does not have the above-described disadvantages of cellulose derivatives for certain coil uses.

Many of the cellulose derivatives used in electrical coils require a large amount of plasticizer to render them sufficiently flexible for use in winding electrical coils. Such plasticizers frequently have much poorer dielectric strength and are much more unstable than the cellulose derivatives in which they are used. Consequently, properties of the insulating material will suffer and this condition will grow worse with time due to the instability of the plasticizer.

It has been found, in accordance with the present invention, that such sheet material of the referred-to polyamides may be used for interleaving, interwinding and as inner and outer peripheral covering layers for electrical coils without incorporating therein plasticizing materials susceptible to deterioration with aging. Once the coil is wound, such sheet material of the referred-to polyamides is sufficiently flexible or non-brittle to withstand the use to which such coils are put. In this manner, full advantage may be taken of the excellent insulating properties of the described material derived from the referred-to polyamides, such as its relatively low-moisture absorption properties, high dielectric strength, light weight and insolubility in most liquids.

Referring to the drawing, particularly Fig. 1, a multiple winding electrical coil 5, is shown, in which an insulating sheet 6 of the referred-to polyamide material is wrapped two turns about a core 7 of magnetic material to form a tube about the core. Alternate layers of wire and interleaving sheets of cellulose acetate, indicated in general at 9, are then applied to the tube 6 until a coil of proper size is built up comprising a primary winding 10, after which an interwinding of an insulating sheet 11 of the referred-to polyamide material is wrapped two turns about the primary winding. A secondary winding 12, built up in the manner of the primary winding 10, is then applied over the interwinding of the referred-to sheet 11, after which an outer cover 14, comprising two turns and a lap of an insulating sheet of the referred-to polyamide material, is wrapped about the secondary winding 12 and its seam, indicated at 16, is sealed by applying a suitable cement therealong and pressing the edge portions thereof together. Preferably, the interwinding of the referred-to sheet 11 and the interleaving sheets of cellulose acetate extend at opposite ends suitable distances beyond the wire windings, as shown in Fig. 2 at 17, so that they may be crushed against the wire windings and sealed by the application of acetate or other suitable cement thereto.

Many types of electrical coils require spool heads. In Fig. 1 of the drawing, a spool head is shown comprising an apertured phenol fiber disc 18 having an integral inner facing of cellulose acetate 19. The apertured spool head may be threaded onto the end of the core 7 and pressed into position against the end face of the coil, the core being peripherally knurled at 20 to provide a firm grip on the annular wall of the aperture in the spool head. To cement the cellulose acetate facing 19 of the spool head to the end face of the coil, acetone may be applied to the facing just prior to the pressing of the spool head onto the core and against the end face of the coil. A suitable cellulose acetate lacquer may be applied at the annular juncture, indicated at 22, between the spool head facing 19 and the cover 14 if a seal is found necessary at this juncture.

Fig. 2 illustrates a modified form of electrical coil 23, which may be wound on a core member 24, which may be the arbor or mandrel of a winding machine. The coil 23 comprises a tube of two turns of an insulating sheet 26 of the referred-to polyamide material. Following the forming of the tube 26, alternating layers of wires and interleaving insulating sheets of the referred-to polyamide material, indicated in general at 27, are applied to the tube 26 until a winding of proper size is built up. A covering 31, also of the sheet material of the referred-to polyamide material and comprising two layers and a lap, is then applied to the wound coil 23 and sealed at its seam 32 (Fig. 3) by applying a cement therealong and pressing the edge portions thereof together. Thereafter, the ends of the insulating sheets of the referred-to polyamide material which extend beyond the wire windings are crushed against the windings and sealed by the application of acetate or other suitable cement to form a coil such as shown in Fig. 3, the core member 24 having been removed.

What is claimed is:

1. An electrical coil comprising an inner tube of a polyamide obtainable by condensation polymerization from a diamine and a dibasic carboxylic acid, a winding thereon, insulation between the layers of the windings, and a covering of said polyamide material applied thereover.

2. An electrical coil comprising alternate layers of windings and interleaving material composed of a polyamide obtainable by condensation polymerization from a diamine and a dibasic carboxylic acid.

3. An electrical coil comprising an inner tube of a polyamide obtainable by condensation polymerization from a diamine and a dibasic carboxylic acid, alternate layers of windings and interleaving material of said polyamide material thereon, and a covering of said polyamide material applied thereover.

4. An electrical coil comprising an inner tube of a material consisting of a polyamide obtainable by condensation polymerization from a diamine and a dibasic carboxylic acid, multiple windings thereon of alternate layers of conducting material and insulation, an interwinding material of said polyamide material between said windings, and a covering of said polyamide material applied over the outer winding.

5. An electrical coil comprising an inner tube of a material consisting of a polyamide obtainable by condensation polymerization from a diamine and a dibasic carboxylic acid, multiple windings thereon of alternate layers of conducting material and interleaving cellulose acetate, an interwinding of said polyamide material between said windings, and a covering of said polyamide material applied over the outer winding.

6. An electrical coil comprising alternate layers of windings and interleaving sheets of a material consisting of a polyamide obtainable by condensation polymerization from a diamine and a dibasic carboxylic acid, said sheets projecting from the ends of the layers of windings, adjacent projecting portions of said sheets being sealed to form an enclosed coil.

7. An electrical coil comprising alternate layers of windings and interleaving sheets of a material consisting of a polyamide obtainable by condensation polymerization from a diamine and a dibasic carboxylic acid, said sheets projecting from the ends of the layers of windings, adjacent projecting portions of said sheets being crushed against the ends of said layers of windings and cemented thereagainst.

8. An electrical coil comprising an inner tube of a material consisting of a polyamide obtainable by condensation polymerization from a diamine and a dibasic carboxylic acid, alternate layers of windings and interleaving sheets of said polyamide material applied thereover, said sheets and covering projecting from the ends of the layers of windings, adjacent projecting portions of said sheets and covering being sealed to form an enclosed coil.

9. An electrical coil comprising an inner tube of sheet material consisting of a polyamide obtainable by condensation polymerization from a diamine and a dibasic carboxylic acid, alternate layers of windings and interleaving sheets of cellulose acetate thereon, and a covering of sheet of said polyamide material applied thereover, said sheets projecting from the ends of said layers of windings, adjacent projecting portions of said sheets being crushed against the ends of said layers of windings and cemented thereagainst.

10. An electrical coil having inner and outer layers of a material comprising a polyamide obtainable by condensation polymerization from a diamine and a dibasic carboxylic acid, and a head having an outer layer of phenol fiber and an inner layer of cellulose acetate cemented to said layers of said polyamide material.

11. An electrical coil having inner and outer layers of a material consisting of a polyamide obtainable by condensation polymerization from a diamine and a dibasic carboxylic acid, alternate layers of windings and interleaving cellulose acetate between said inner and outer layers of said polyamide material, and a head having an outer layer of phenol fiber and an inner layer of cellulose acetate cemented to said layers of polyamide material and cellulose acetate.

12. An electrical coil having inner and outer layers of sheet material consisting of a polyamide obtainable by condensation polymerization from a diamine and a dibasic carboxylic acid, alternate layers of windings and interleaving sheets of cellulose acetate between said inner and outer layers of said polyamide material, adjacent projecting portions of said sheets being crushed against the ends of said layers of windings and cemented thereagainst, and a head having an outer layer of phenol fiber and an integral inner facing of cellulose acetate cemented to said sheets.

13. An electrical coil comprising an inner tube consisting of a polyamide obtainable by condensation polymerization from a diamine and a dibasic carboxylic acid, layers of winding on said tube, sheets of said polyamide material between some of said layers, and a covering material of said polyamide material applied thereover.

HERBERT P. HEATH.

REFERENCES CITED

The following references are of record in the file of this patent:

UNITED STATES PATENTS

| Number | Name | Date |
|---|---|---|
| 1,633,577 | Franks | June 28, 1927 |
| 1,837,733 | Stearns | Dec. 22, 1931 |
| 1,888,275 | Larsen | Nov. 22, 1932 |
| 1,932,640 | Rust | Oct. 31, 1933 |
| 1,998,827 | Worrell | Apr. 23, 1935 |
| 2,013,686 | Homer | Sept. 10, 1935 |
| 2,118,924 | Henderson | May 31, 1938 |
| 2,313,234 | Gavitt | Mar. 9, 1943 |
| 2,349,952 | Fuller | May 30, 1944 |

FOREIGN PATENTS

| Number | Country | Date |
|---|---|---|
| 375,507 | Great Britain | June 30, 1932 |

OTHER REFERENCES

Electrical World, June 12, 1943, pages 69 to 71, article on "Electrical Application of New Thermoplastics."